United States Patent
Chung

(10) Patent No.: US 10,409,081 B2
(45) Date of Patent: Sep. 10, 2019

(54) LIGHT SPLITTING APPARATUS UTILIZING GLASS SUBSTRATE FOR PHASE RETARDATION

(71) Applicant: HIMAX TECHNOLOGIES LIMITED, Tainan (TW)

(72) Inventor: Jun-Wen Chung, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 109 days.

(21) Appl. No.: 15/633,773

(22) Filed: Jun. 27, 2017

(65) Prior Publication Data
US 2018/0373055 A1    Dec. 27, 2018

(51) Int. Cl.
*G02B 27/28* (2006.01)
*G02B 5/30* (2006.01)
*F21V 8/00* (2006.01)

(52) U.S. Cl.
CPC ......... *G02B 27/286* (2013.01); *G02B 6/0056* (2013.01); *G02B 6/0065* (2013.01); *G02B 27/283* (2013.01); *G02B 5/3083* (2013.01)

(58) Field of Classification Search
None
See application file for complete search history.

(56) References Cited

U.S. PATENT DOCUMENTS

| | | | | |
|---|---|---|---|---|
| 6,309,071 B1* | 10/2001 | Huang | ........... | H04N 9/3111 348/E9.027 |
| 6,490,087 B1* | 12/2002 | Fulkerson | ........... | G02B 27/283 348/E5.141 |
| 7,242,517 B2* | 7/2007 | Ghidini | ........... | G02F 1/093 359/333 |
| 2006/0209220 A1* | 9/2006 | Hara | ........... | G02B 27/283 349/5 |
| 2015/0029588 A1* | 1/2015 | Fiorentino | ........... | G02B 5/1809 359/572 |

FOREIGN PATENT DOCUMENTS

TW  201333535 A1  8/2013
TW  201339643 A   10/2013

* cited by examiner

*Primary Examiner* — Derek S. Chapel
(74) *Attorney, Agent, or Firm* — Winston Hsu

(57) ABSTRACT

A light splitting apparatus includes a first glass substrate, a second glass substrate and a third glass substrate. The first glass substrate guides a first color light beam of incident light to a display device, and changes a polarization direction of a first intermediate light beam of the incident light to produce a second intermediate light beam. The first color light beam is polarized a first polarization direction. The second intermediate light beam includes a second color light beam polarized in a second polarization direction and a third color light beam. The second glass substrate guides the second color light beam polarized in the second polarization direction to the display device, and changes a polarization direction of the third color beam to a third polarization direction. The third glass substrate guides the third color light beam polarized in the third polarization direction to the display device.

4 Claims, 5 Drawing Sheets

LIGHT SPLITTING APPARATUS UTILIZING GLASS SUBSTRATE FOR PHASE RETARDATION

BACKGROUND OF THE INVENTION

1. Field of the Invention

The disclosed embodiments of the present invention relate to light splitting, and more particularly, to a light splitting apparatus including a glass substrate capable of polarizing light and retarding a phase of a light beam.

2. Description of the Prior Art

A conventional display apparatus utilizes polarizers, phase retarders and electrochromic substrates to control optical transmission paths of light beams therewithin. However, optical performance of a phase retarder degrades in short wavelength applications because the phase retarder is made of plastic materials. In addition, the phase retarder will exhibit undesirable wrinkles when attached to a polarizer, and precision alignment between the phase retarder and the polarizer is difficult to achieve. Further, the conventional apparatus utilizes pressure-sensitive adhesives to bond chips each including polarizer(s) and phase retarder(s), but the chips cannot be bonded tightly in order to prevent damages to a microstructure on a phase retarder. The bonded chips will exhibit low reliability and have a great thickness.

SUMMARY OF THE INVENTION

In accordance with exemplary embodiments of the present invention, a light splitting apparatus including a glass substrate capable of polarizing light and retarding a phase of a light beam is proposed to solve the above-mentioned problems.

According to an embodiment of the present invention, an exemplary light splitting apparatus is disclosed. The exemplary light splitting apparatus comprises a first glass substrate, a second glass substrate and a third glass substrate. The first glass substrate is arranged for guiding a first color light beam of incident light to a display device, and changing a polarization direction of a first intermediate light beam of the incident light to produce a second intermediate light beam, wherein the first color light beam is polarized a first polarization direction, the second intermediate light beam comprises a second color light beam polarized in a second polarization direction and a third color light beam. The second glass substrate is disposed in correspondence with a side of the first glass substrate, and is arranged for guiding the second color light beam polarized in the second polarization direction to the display device, and changing a polarization direction of the third color beam such that the third color beam is polarized in a third polarization direction. The third glass substrate is disposed in correspondence with a side of the second glass substrate, and is arranged for guiding the third color light beam polarized in the third polarization direction to the display device, wherein the second glass substrate is disposed between the first glass substrate and the third glass substrate.

The proposed light splitting apparatus may include a glass substrate used for light polarization and phase retardation (e.g. a glass substrate having a birefringence characteristic) to split light into different color light beams without the use of a phase retarder, thus reducing manufacturing costs, enhancing product reliability and decreasing the total thickness of the chips stacked in the proposed light splitting apparatus. Additionally, as the proposed light splitting apparatus may utilize optical adhesives to bond different glass substrates together, the black coating may be applied only once to prevent edge leakage of light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
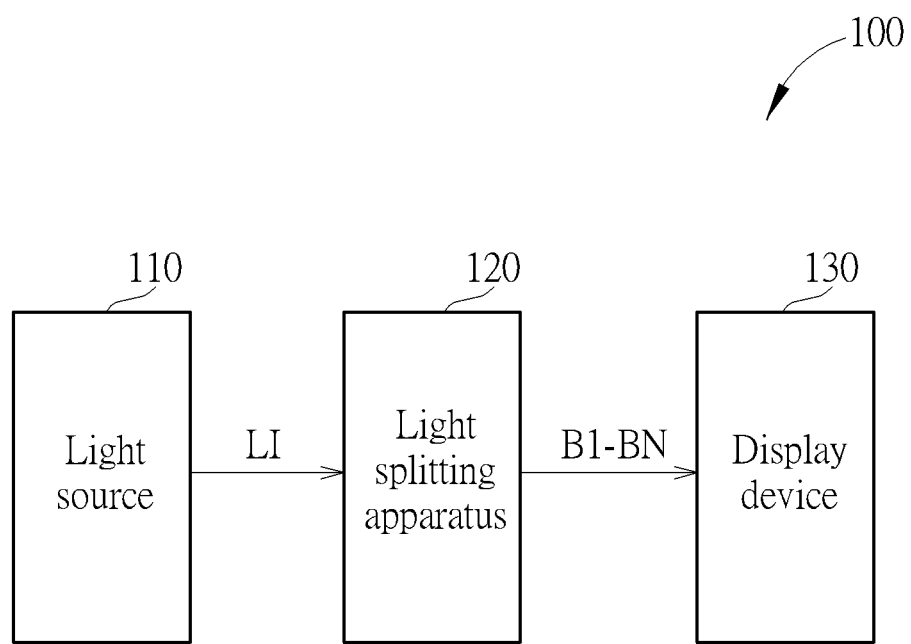
FIG. 1 is a block diagram illustrating an exemplary display apparatus according to an embodiment of the present invention.

Please refer to FIG. 1, which is a block diagram illustrating an exemplary display apparatus according to an embodiment of the present invention. The display apparatus 100 may be implemented in a variety of forms, such as a television, a projection display apparatus, a portable display apparatus or a wearable display apparatus, and may include, but is not limited to a light source 110, a light splitting apparatus 120 and a display device. The light source 110 may emit incident light LI to the light splitting apparatus 120, and the light splitting apparatus 120 may utilize a plurality of glass substrates (or cover lens; not shown in FIG. 1) to split the incident light LI into a plurality of color light beams B1-BN (N is a positive integer greater than one), wherein at least one of the glass substrates is capable of polarizing light and retarding a phase of a light beam. Next, the display device 130 may display an image according to the color light beams B1-BN. By way of example but not limitation, the color light beams B1-BN may be three color light beams such as a red light beam, a green light beam and a blue light beam respectively. The display device 130 may display the image according to the red light beam, the green light beam and the blue light beam.

Please note that the types and/or the number of the color light beams B1-BN produced by the light splitting apparatus 120 may be determined based on actual design considerations. In one example, the light splitting apparatus 120 may split the incident light LI into three primary color light beams including a cyan light beam, a magenta light beam and a yellow light beam, and output the three primary color light beams as the color light beams B1-BN. In another example, the light splitting apparatus 120 may split the incident light LI into four primary color light beams, such as a red light beam, a green light beam, a blue light beam and a yellow light beam, and output the four primary color light beams as the color light beams B1-BN. In yet another example, the light splitting apparatus 120 may split the incident light LI into six primary color light beams, such as a red light beam, a green light beam, a blue light beam, a cyan light beam, a magenta light beam and a yellow light beam, and output the six primary color light beams as the color light beams B1-BN. In addition, as the light splitting apparatus 120 may split the incident light LI without the use of phase retarder(s), the light splitting apparatus 120 (or the display apparatus 100) may have low manufacturing costs and high reliability.

Figure 2:
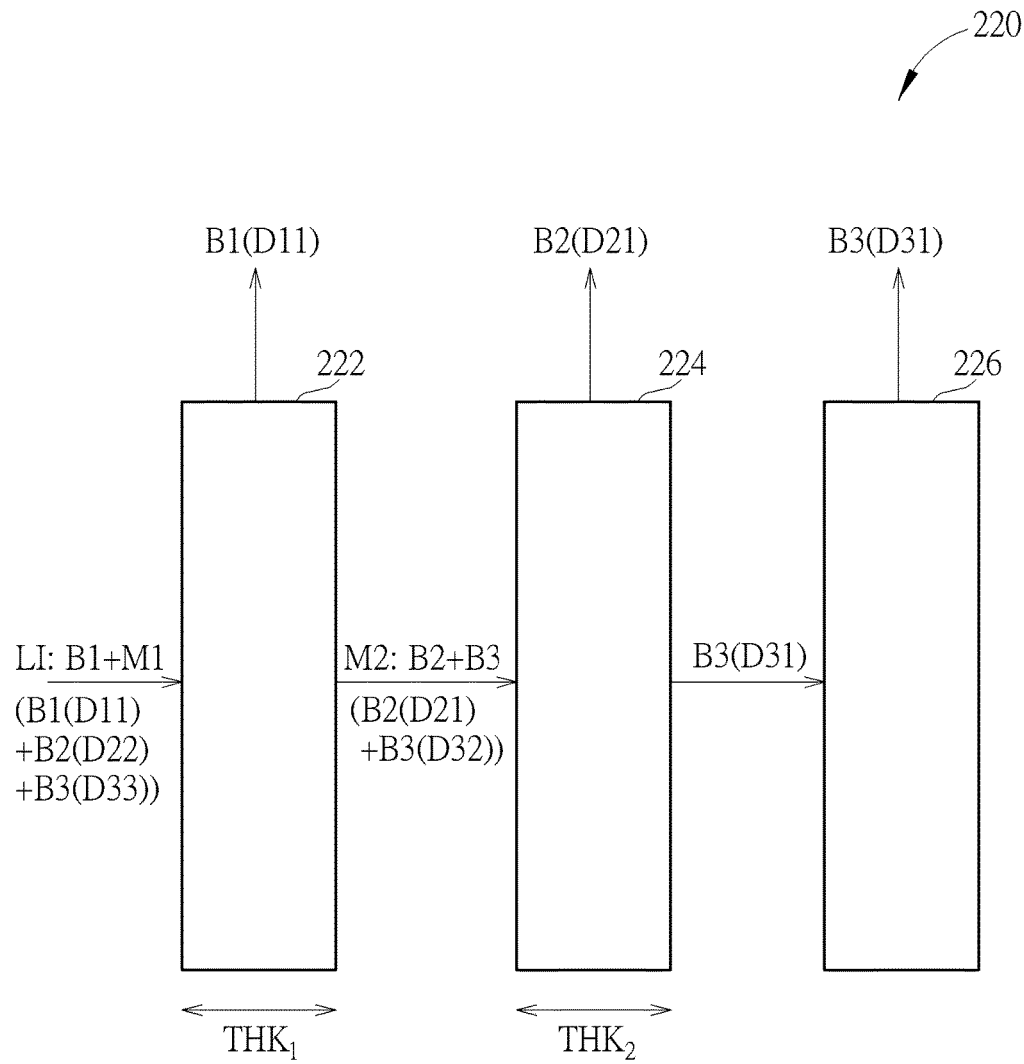
FIG. 2 is an implementation of the light splitting apparatus shown in FIG. 1.

To facilitate an understanding of the present invention, an exemplary implementation where the proposed light splitting apparatus splits incident light into three color light beams is given in the following for further description. However, this is not meant to be a limitation of the present invention. As long as a light splitting apparatus may utilize a glass substrate, which is capable of polarizing light and retarding a phase of a light beam, to split incident light into a plurality of color light beams, various modifications and alternatives fall within the scope of the prevent invention. Please refer to FIG. 2 in conjunction with FIG. 1. FIG. 2 is an implementation of the light splitting apparatus 120 shown in FIG. 1. In this implementation, the light splitting apparatus 220 may include, but is not limited to, a plurality of glass substrates 222-226. The glass substrates 222-226 are arranged for splitting the incident light LI into a plurality of color light beams B1-B3, wherein the glass substrate 224 is disposed between the glass substrate 222 and the glass substrate 226. The glass substrate 222 may guide light beam(s) satisfying a first predetermined optical characteristic (e.g. a light beam polarized in a polarization direction D11) to the display device 130, change polarization direction(s) of remaining light beam(s), and transmit the remaining light beam(s) having the changed polarization direction(s) to the glass substrate 224. The glass substrate 224 may guide light beam(s) satisfying a second predetermined optical characteristic (e.g. a light beam polarized in a polarization direction D21) to the display device 130, change polarization direction(s) of remaining light beam(s), and transmit the remaining light beam(s) having the changed polarization direction(s) to the glass substrate 226. The glass substrate 226 may guide light beam(s) satisfying a third predetermined optical characteristic (e.g. a light beam polarized in a polarization direction D31) to the display device 130. Further description is provided below.

In this embodiment, the glass substrate 222 may guide the color light beam B1 of the incident light LI to the display device 130, and change a polarization direction of an intermediate light beam M1 of the incident light LI to produce an intermediate light beam M2, wherein the color light beam B1 may be polarized the polarization direction D11 (satisfying the first predetermined optical characteristic), the intermediate light beam M2 may include the color light beam B2 polarized in a polarization direction D21 and the color light beam B3. In other words, as the glass substrate 222 may change the polarization direction of the intermediate light beam M1, a polarization direction of the color light beam B2 included in the intermediate light beam M1 may be changed from a polarization direction D22 to the polarization direction D21. Hence, when the color light beam B2 polarized in the polarization direction D21 is incident on the glass substrate 224, the glass substrate 224 may guide the color light beam B2 polarized in the polarization direction D21 (satisfying the second predetermined optical characteristic) to the display device 130. Additionally, in this embodiment, the color light beam B3 included in the intermediate light beam M1 may be polarized in a polarization direction D33, and the glass substrate 222 may change a polarization direction of the color light beam B3 from the polarization direction D33 to a polarization direction D32.

The glass substrate 224 is disposed in correspondence with a side of the glass substrate 222. In addition to guiding the color light beam polarized in the polarization direction D21 to the display device 130, the glass substrate 224 may change the polarization direction of the color light beam B3 such that the color beam B3 is polarized in the polarization direction D31. In other words, the glass substrate 224 may change the polarization direction of the color light beam B3 from the polarization direction D32 to the polarization direction D31. Hence, when the color light beam B3 polarized in the polarization direction D31 is incident on the glass substrate 226 (disposed in correspondence with a side of the glass substrate 224), the glass substrate 226 may guide the color light beam B3 polarized in the polarization direction D31 (satisfying the third predetermined optical characteristic) to the display device 130.

Figure 3:
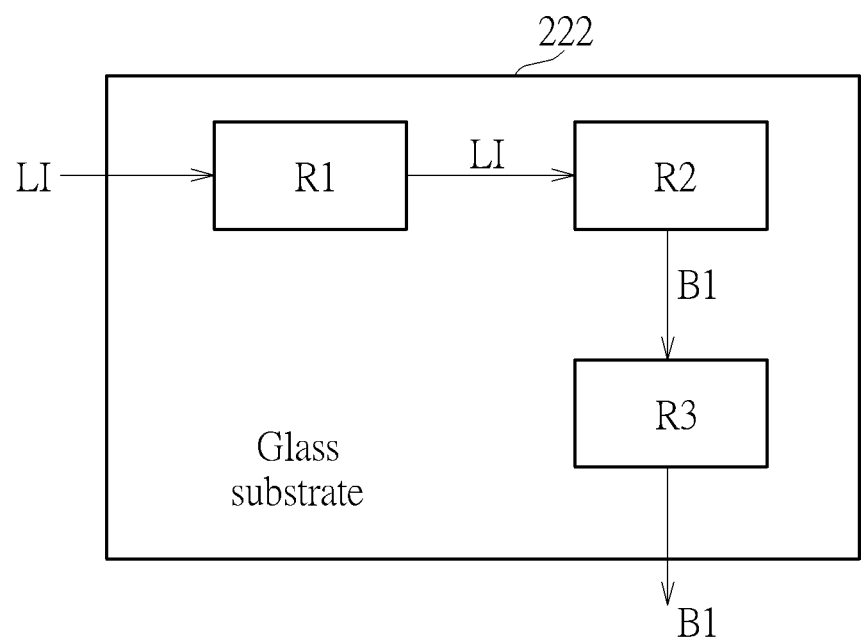
FIG. 3 is an implementation of the glass substrate shown in FIG. 2.

In some embodiments, at least one of the glass substrates 222-226 may have an optical microstructure disposed therein to guide a light beam polarized in a specific polarization direction (e.g. the polarization direction D11/D21/D31) to the display device 130. Please refer to FIG. 2 in conjunction with FIG. 3. FIG. 3 is an implementation of the glass substrate 222 shown in FIG. 2. In this implementation, the glass substrate 222 may include, but is not limited to, a light input region R1, an optical microstructure R2 and a light output region R3. The light input region R1 may receive light incident on the glass substrate 222 (e.g. the incident light LI), and guide the light to the optical microstructure R2. Next, the optical microstructure R2 may guide a light beam polarized in the polarization direction D11 (e.g. the color light beam B1) to the light output region R3 such that the light beam polarized in the polarization direction D11 may be transmitted to a display device (e.g. the display device 130 shown in FIG. 1) through the light output region R3. The remaining light beam(s) of the light (light beam(s)) not guided to the light output region R3, such as the intermediate light beam M1) may be transmitted to the glass substrate 224 after a polarization direction thereof is changed. It should be noted that the glass substrate 224 and/or the glass substrate 226 may be implemented by the structure shown in FIG. 3.

Additionally, in some embodiments, at least one of the glass substrates 222-226 may have a birefringence characteristic to split incident light and change a polarization direction of a light beam component of the incident light. By way of example but not limitation, at least one of the glass substrates 222-226 may be a sapphire substrate, a quartz substrate, a tourmaline substrate or a rutile substrate. Please not that, in one embodiment, the higher refractive index a glass substrate has, the less the amount of ultraviolet light passing therethrough. In another embodiment where the glass substrate 222/224/226 is implemented by a sapphire substrate, as the sapphire substrate has a high refractive index (e.g. greater than 1.7), high hardness and high transparency (e.g. greater than 85%), the glass substrate 222/224/226 may have a reduced thickness (e.g. 0.4-0.5 mm) while give excellent optical performance.

Figure 4:
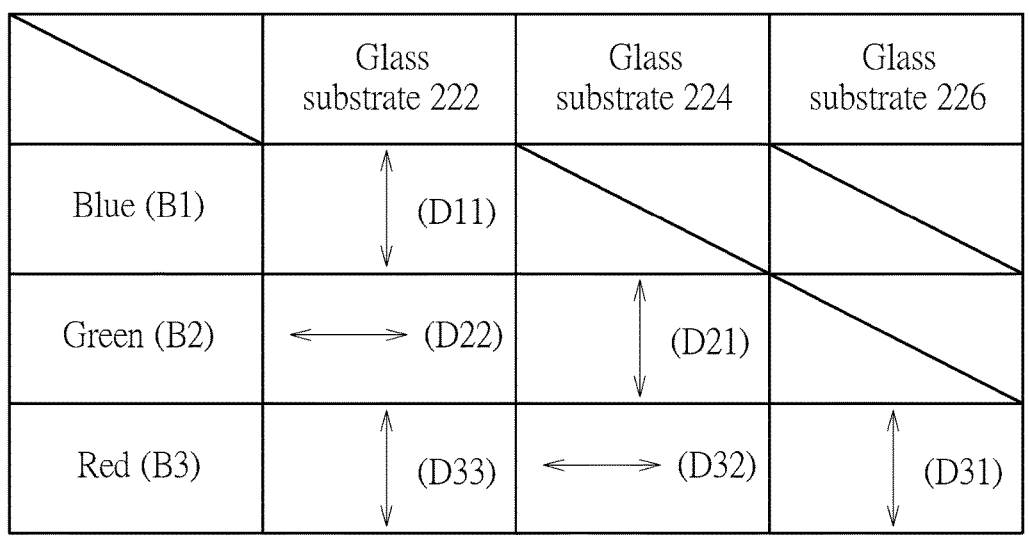
FIG. 4 is a diagram illustrating respective exemplary polarization directions of the color light beams incident on one of the glass substrate shown in FIG. 2 according to an embodiment of the present invention.

Furthermore, in some embodiments, at least two of the polarization directions D11, the polarization direction D21 and the polarization direction D31, which satisfy the first, second and third predetermined optical characteristics respectively, may be identical to each other. Hence, at least two of the color light beams B1-B3 guided to the display device 130 shown in FIG. 1 may have the same polarization direction. Please refer to FIG. 2 and FIG. 4 together. FIG. 4 is a diagram illustrating respective exemplary polarization directions of the color light beams B1-B3 incident on one of the glass substrate 222-226 shown in FIG. 2 according to an embodiment of the present invention. In the embodiment shown in FIG. 4, each of the polarization direction D11, the polarization direction D21 and the polarization direction D31 may be a vertical direction of linear polarization, and the color light beans B1-B3 may be a blue light beam, a green light beam and a red light beam respectively (i.e. RGB primary colors). To put it differently, the incident light LI emitted from the light source 110 shown in FIG. 1 may include a plurality of linearly polarized light beams. However, this is for illustrative purposes only, and is not intended to limit the present invention.

In this embodiment, before the incident light LI is incident on the glass substrate 222, the blue light beam (the color light beam B1) may be linearly polarized in a vertical direction (the polarization direction D11), the green light beam (the color light beam B2) may be linearly polarized in a horizontal direction (the polarization direction D22), and the red light beam (the color light beam B3) may be linearly polarized in the vertical direction (the polarization direction D33). When the incident light LI is incident on the glass substrate 222, the glass substrate 222 may guide the blue light beam polarized in the vertical direction to the display device 130 shown in FIG. 1, change a polarization direction of the green light beam to the vertical direction (the polarization direction D21), and change a polarization direction of the red light beam to the horizontal direction (the polarization direction D32). Hence, when the green light beam polarized in the vertical direction (the polarization direction D21) is incident on the glass substrate 224, the glass substrate 224 may guide the green light beam to the display device 130 shown in FIG. 1. In addition, when the red light beam polarized in the horizontal direction (the polarization direction D32) is incident on the glass substrate 224, the glass substrate 224 may change the polarization direction of the red light beam from the horizontal direction to the vertical direction (the polarization direction D31) such that the glass substrate 226 may guide the red light beam to the display device 130 shown in FIG. 1.

It should be noted that, in this embodiment, the first predetermined optical characteristic associated with the glass substrate 222 may include a predetermined polarization direction and a predetermined wavelength range. In other words, when incident on the glass substrate 222, a light beam polarized in the predetermined polarization direction (the polarization direction D11) and having a wavelength within the predetermined wavelength range may be guided to the display device 130. Hence, although the red light beam is polarized in the vertical direction, the glass substrate 222 may not guide the red light beam to the display device 130 since a wavelength of the red light beam is beyond the predetermined wavelength range.

Additionally, a thickness of the glass substrate 222 may be determined according to a wavelength of the color light beam B2 and an angular difference between the polarization direction D22 and the polarization direction D21, and/or a thickness of the glass substrate 224 may be determined according to a wavelength of the color light beam B3 and an angular difference between the polarization direction D32 and the polarization direction D31. In other words, the thickness of the glass substrate 222 may be determined according to a wavelength of the green light beam and a change in polarization direction, and/or the thickness of the glass substrate 224 may be determined according to a wavelength of the red light beam and a change in polarization direction in this embodiment. For example, in a case where the glass substrate 222 changes the linearly polarized color light beam B2 (the green light beam) from the horizontal direction to the vertical direction, the angular difference between two polarization directions is 90°, which means that a change of the phase difference between two orthogonal field components of the color light beam B2 is 180°. The thickness of the glass substrate 222 may be determined according to the following formula:

$$THK_1 = (\tfrac{1}{2} + 2k_1) \times (\lambda_2 / n_{\mathit{eff1}}),$$

where $THK_1$ is the thickness of the glass substrate 222, $k_1$ is a nonnegative integer, $\lambda_2$ is the wavelength of the color light beam B2, and $n_{\mathit{eff1}}$ is an effective refractive index of the glass substrate 222. In one example where the glass substrate 222 is implemented using a birefringence material, $n_{\mathit{eff1}}$ may be equal to a difference between an extraordinary refraction index and an ordinary refraction index of the glass substrate 222.

Similarly, in a case where the glass substrate 224 changes the linearly polarized color light beam B3 (the red light beam) from the horizontal direction to the vertical direction, as the angular difference between two polarization directions is 90° (a change of the phase difference between two orthogonal field components of the color light beam B3 is 180°), the thickness of the glass substrate 224 may be determined according to the following formula:

$$THK_2 = (\tfrac{1}{2} + 2k_2) \times (\lambda_3 / n_{\mathit{eff2}}),$$

where $THK_2$ is the thickness of the glass substrate 224, $k_2$ is a nonnegative integer, $\lambda_3$ is the wavelength of the color light beam B3, and $n_{\mathit{eff2}}$ is an effective refractive index of the glass substrate 224. In one example where the glass substrate 224 is implemented using a birefringence material, $n_{\mathit{eff2}}$ may be equal to a difference between an extraordinary refraction index and an ordinary refraction index of the glass substrate 224.

Please note that the above is for illustrative purposes only, and is not meant to be a limitation of the present invention. In an alternative design, the respective polarization directions D11, D21 and D31 satisfying the first, second and third predetermined optical characteristics may be different. In another alternative design, the polarization direction D22 of the color light beam B2 incident on the glass substrate 222 may not be perpendicular to the polarization direction D11 of the color light beam B1, the polarization direction D33 of the color light beam B3 incident on the glass substrate 222 may not be identical to the polarization direction D11 of the color light beam B1, and/or the respective polarization directions D22 and D33 of the color light beams B2 and B3 of the intermediate light beam M1 may not be perpendicular to each other. In yet another alternative design, the polarization direction D32 of the color light beam B3 incident on the glass substrate 224 may not be perpendicular to the polarization direction D21 of the color light beam B2 incident on the glass substrate 224.

Additionally, the glass substrate 222/224 is not limited to changing a polarization direction of a color light beam from one of a horizontal direction and a vertical direction of linear polarization to the other of the horizontal direction and the vertical direction. In brief, as long as a light splitting apparatus may utilize a glass substrate, which is capable of polarizing light and retarding a phase of a light beam, to split incident light into a plurality of color light beams without the use of a phase retarder, various modifications and alternatives fall within the scope of the prevent invention.

Since there may be no need to dispose a phase retarder between glass substrates in the proposed light splitting apparatus, the proposed light splitting apparatus may utilize an optical adhesive to bond different glass substrates together to thereby encapsulate the glass substrates. Please refer to FIG. 5, which is another implementation of the light splitting apparatus 120 shown in FIG. 1. The light splitting apparatus 520 may include, but is not limited to, a plurality of glass substrates 522-526, an optical adhesive 532 and an optical adhesive 534, wherein the glass substrates 522-526 may be implemented by the glass substrates 222-226 shown in FIG. 2 respectively. In this implementation, the light splitting apparatus 520 may utilize the optical adhesive 532 and the optical adhesive 534 to stack the glass substrates 522-526, wherein the optical adhesive 532 may bond the glass substrate 522 and the glass substrate 524 together, and the optical adhesive 534 may bond the glass substrate 524 and the glass substrate 526 together. At least one of the optical adhesive 532 and the optical adhesive 534 may be a heat curing adhesive/resin or a light curing adhesive (e.g. an ultraviolet curing adhesive).

Figure 5:
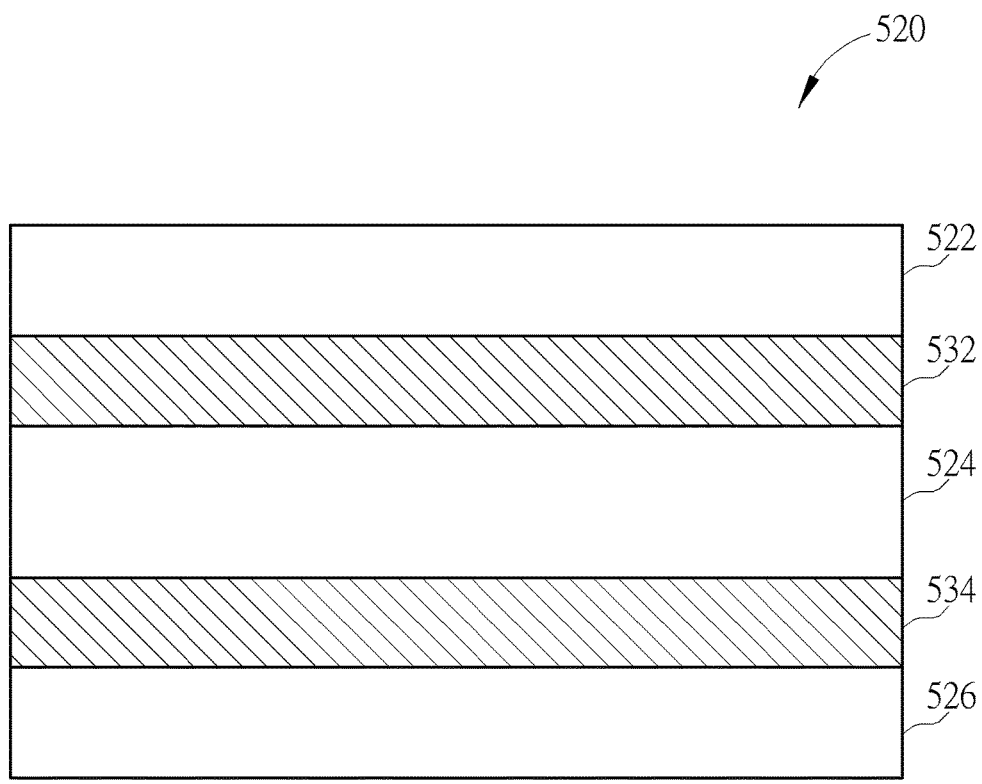
FIG. 5 is another implementation of the light splitting apparatus shown in FIG. 1.

The structure of the light splitting apparatus 520 shown in FIG. 5 is for illustrative purposes only, and is not intended to limit the present invention. For example, the light splitting apparatus 520 may include an anti-reflection coating (ARC) or an optical microstructure (not shown in FIG. 5) formed on at least one glass substrate to increase light transmission/transparency. In another example, after completion of the stack structure shown in FIG. 5, the light splitting apparatus 520 may have a black coating formed on edges of the glass substrates 522-526 to prevent edge leakage of light (not shown in FIG. 5).

It should be noted that, regarding a conventional light splitting structure, a black coating process has to be performed once each time a chip (including a polarizer and a phase retarder) in the conventional light splitting structure is fabricated. All chips in the conventional light splitting structure have to undergo the black coating process before encapsulation. In other words, if the conventional light splitting structure includes three chips, the black coating process has to be performed three times to prevent edge leakage of light. In contrast to the conventional light splitting structure, as the proposed light splitting may not need a phase retarder and hence may utilize an optical adhesive to bond different substrates together, the black coating process may be applied only once after completion of stacking all glass substrates (or chips). In other words, the proposed light splitting apparatus may not only reduce a total thickness but also reduce manufacturing costs associated with the black coating process.

To sum up, the proposed light splitting apparatus may include a glass substrate used for light polarization and phase retardation (e.g. a glass substrate having a birefringence characteristic) to split light into different color light beams without the use of a phase retarder, thus reducing manufacturing costs, enhancing product reliability and decreasing the total thickness of the chips stacked in the proposed light splitting apparatus. Additionally, as the proposed light splitting apparatus may utilize optical adhesives to bond different glass substrates together, the black coating may be applied only once to prevent edge leakage of light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light splitting apparatus, comprising:
   a first glass substrate, arranged for guiding a first color light beam of incident light to a display device, and changing a polarization direction of a first intermediate light beam of the incident light to produce a second intermediate light beam, wherein the first color light beam is polarized a first polarization direction, the second intermediate light beam comprises a second color light beam polarized in a second polarization direction and a third color light beam;
   a second glass substrate, disposed in correspondence with a side of the first glass substrate, the second glass substrate arranged for guiding the second color light beam polarized in the second polarization direction to the display device, and changing a polarization direction of the third color beam such that the third color beam is polarized in a third polarization direction; and
   a third glass substrate, disposed in correspondence with a side of the second glass substrate, the third glass substrate arranged for guiding the third color light beam polarized in the third polarization direction to the display device, wherein the second glass substrate is disposed between the first glass substrate and the third glass substrate.

2. The light splitting apparatus of claim 1, wherein the first intermediate light beam comprises the second color light beam polarized in a fourth polarization direction, and the first glass substrate changes a polarization of the second color light beam from the fourth polarization direction to the second polarization direction; and a thickness of the first glass substrate is determined according to a wavelength of the second color light beam and an angular difference between the fourth polarization direction and the second polarization direction.

3. The light splitting apparatus of claim 1, wherein the first intermediate light beam comprises the second color light beam polarized in a fourth polarization direction and the third color light beam polarized in the first polarization direction, and the fourth polarization direction is perpendicular to the first polarization direction; the first glass substrate changes a polarization of the second color light beam from the fourth polarization direction to the second polarization direction, and changes the polarization of the third color light beam from the first polarization direction to a fifth polarization direction perpendicular to the second polarization direction.

4. The light splitting apparatus of claim 1, wherein at least one of the first glass substrate, the second glass substrate and the third glass substrate has a birefringence characteristic.

* * * * *